United States Patent
Braun et al.

(10) Patent No.: US 11,509,212 B2
(45) Date of Patent: Nov. 22, 2022

(54) SWITCHED-MODE POWER SUPPLY WITH VOLTAGE LIMITATION

(71) Applicant: SIEMENS AKTIENGESELLSCHAFT, Munich (DE)

(72) Inventors: Carsten Braun, Berlin (DE); Joerg Braune, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/160,635

(22) Filed: Jan. 28, 2021

(65) Prior Publication Data

US 2021/0234459 A1 Jul. 29, 2021

(30) Foreign Application Priority Data

Jan. 28, 2020 (DE) .......................... 102020201006.4

(51) Int. Cl.
*H02M 1/44* (2007.01)
*H02M 1/12* (2006.01)
*H02M 1/32* (2007.01)
*H02M 7/04* (2006.01)

(52) U.S. Cl.
CPC .............. *H02M 1/44* (2013.01); *H02M 1/32* (2013.01); *H02M 7/04* (2013.01); *H02M 1/123* (2021.05); *H02M 1/126* (2013.01)

(58) Field of Classification Search
CPC combination set(s) only.
See application file for complete search history.

(56) References Cited

U.S. PATENT DOCUMENTS

| 2003/0079486 A1* | 5/2003 | Kato | H02M 5/458 62/215 |
| 2003/0127913 A1* | 7/2003 | Roberts, Jr. | H04B 3/28 307/89 |
| 2006/0291128 A1 | 12/2006 | Terada | |
| 2008/0285315 A1* | 11/2008 | Lee | H02M 1/44 363/44 |
| 2011/0181994 A1 | 7/2011 | Liao | |
| 2012/0044599 A1* | 2/2012 | Veskovic | H02H 9/005 361/91.1 |

(Continued)

FOREIGN PATENT DOCUMENTS

| DE | 102011056288 A1 * | 6/2013 | ............. H02M 1/44 |
| DE | 102014213068 A1 | 1/2016 | |

(Continued)

*Primary Examiner* — Gary A Nash
(74) *Attorney, Agent, or Firm* — Laurence A. Greenberg; Werner H. Stemer; Ralph E. Locher

(57) ABSTRACT

A switched-mode power supply has a rectifier device, a switching unit which is arranged downstream of the rectifier device, a transmission device which is arranged downstream of the switching unit and a filter device. In order to reduce the sensitivity of the switched-mode power supply to high-energy interferences, it is proposed that the filter device contains a current-compensated choke coil which is connected to a voltage limiter circuit in such a way that in the case of interference signals applied to the choke coil, a damping of the interference signals takes place by way of the voltage limiter circuit.

3 Claims, 2 Drawing Sheets

(56) References Cited

U.S. PATENT DOCUMENTS

| | | | |
|---|---|---|---|
| 2014/0266507 A1* | 9/2014 | Fauer | H02M 1/126 |
| | | | 333/181 |
| 2015/0003125 A1 | 1/2015 | Lee et al. | |
| 2015/0222109 A1 | 8/2015 | Wang et al. | |
| 2016/0105097 A1* | 4/2016 | Kristensen | H02M 1/126 |
| | | | 29/829 |
| 2017/0302165 A1* | 10/2017 | Marcinkiewicz | H02M 1/4216 |
| 2018/0312075 A1* | 11/2018 | Albanna | B60L 53/22 |

FOREIGN PATENT DOCUMENTS

| | | | |
|---|---|---|---|
| DE | 202015106305 U1 | 2/2017 | |
| EP | 2903113 A1 | 8/2015 | |
| JP | H05198444 A | 8/1993 | |
| JP | H05199737 A | 8/1993 | |
| JP | H09172733 A | 6/1997 | |
| JP | 2006060917 A | 3/2006 | |
| WO | WO-2010046247 A1 * | 4/2010 | H02H 9/042 |
| WO | 2015068998 A1 | 5/2015 | |
| WO | WO-2018101081 A1 * | 6/2018 | H02M 1/00 |

\* cited by examiner

SWITCHED-MODE POWER SUPPLY WITH VOLTAGE LIMITATION

CROSS-REFERENCE TO RELATED APPLICATION

This application claims the priority, under 35 U.S.C. § 119, of German patent application DE 10 2020 201 006.4, filed Jan. 28, 2020; the prior application is herewith incorporated by reference in its entirety.

BACKGROUND OF THE INVENTION

Field of the Invention

The invention relates to a switched-mode power supply having a rectifier device, a switching unit which is arranged downstream of the rectifier device, a transmission device which is arranged downstream of the switching unit and having a filter device.

Switched-mode power supplies are used in a variety of ways for supplying energy to electrical devices. For example, they are used in electrical automation devices, in order to provide electrical energy at a voltage level which is suitable for the automation devices.

A switched-mode power supply of the type mentioned at the outset is known from published, non-prosecuted German patent application DE 10 2014 213 068 A1, for example.

Filter devices are used in switched-mode power supplies, in order to suppress interferences which take effect inside the power supply and outside of the power supply. Interferences from the switched-mode power supply which take effect in the power grid are often also referred to as radio interference voltages. In the case of particularly high-energy interferences, referred to as "surge" or "ring wave" in IEC standard IEC 61000, for example, when applied as a common mode interference, a voltage rise can occur downstream of the filter device which is double the input voltage of the switched-mode power supply. This rise can result in a sparkover in the switched-mode power supply to ground potential.

This problem is usually dealt with by exposing the switched-mode power supplies to less interference levels or by maintaining greater distances to the housing with respect to the circuit layout.

BRIEF SUMMARY OF THE INVENTION

Based on a switched-mode power supply of the type mentioned at the outset, the underlying object of the invention is to reduce the sensitivity of the switched-mode power supply to high-energy interferences.

With the foregoing and other objects in view there is provided, in accordance with the invention, a switched-mode power supply, containing a rectifier, a switching unit disposed downstream of the rectifier, a transmission device disposed downstream of the switching unit and a filter. The filter has a voltage limiter circuit and a current-compensated choke coil connected to the voltage limiter circuit in such a way that in a case of interference signals applied to the current-compensated choke coil, a damping of the interference signals takes place by way of the voltage limiter circuit.

This object is achieved by the features of the independent claim. Specifically, provision is made for the filter device to contain a current-compensated choke coil which is connected to a voltage limiter circuit in such a way that in the case of interference signals applied to the choke coil, a damping of the interferences takes place by way of the voltage limiter circuit.

In this way, a high damping of high-energy interferences can be achieved with a low level of complexity with regard to circuitry and a transmission of external interferences into the switched-mode power supply or a decoupling of internal interferences into the power grid (radio interference voltages) can be prevented.

According to an advantageous embodiment of the switched-mode power supply according to the invention, provision can be made for the voltage limiter circuit to comprise a surge arrester and an electrical resistor, preferably a varistor.

The surge arrester can be a gas discharge tube with a defined firing voltage, for example. This component has the advantage of a very low coupling capacitance in the range of a few pF. In this case, the minimum firing voltage of the surge arrester must be below the maximum input voltage of the circuit, since otherwise the arrester would ignite. The varistor is used for damping the interference pulses. Alternatively, an ohmic resistor could also be used.

Specifically, provision can be made in this context for the surge arrester and the varistor to be connected in series.

In this context, one further advantageous embodiment makes provision for the surge arrester, on the input side, to be connected to an input of the choke coil which is connected to a first conductor and for the varistor, on the output side, to be connected to an output of the choke coil which is connected to a second conductor.

As a result, a voltage-dependent voltage limiter circuit in the form of the series connection of the surge arrester and the varistor is provided via the current-compensated choke coil. If a sufficient potential difference arises via the current-compensated choke coil in the case of a high-energy interference exposure to ground potential, the surge arrester ignites and the oscillation is damped via the varistor. During normal operation, in the case of which the circuit is not exposed to any interferences (for example "surge" or "ring wave"), the voltage limiter circuit has a very high impedance and does not present a parallel path via which interference signals as radio interference voltages could leave the switched-mode power supply in the direction of the power grid.

In this case, it is particularly noteworthy that protection against interferences is achieved according to the invention by means of an individual voltage limiter circuit which contains a surge arrester and which is virtually "diagonally" connected via the choke coil. By way of its interconnection, it protects against surge and ring wave interference pulses, for example, both in the differential mode (between the conductors L and N) and in the common mode between the conductor pair LN and ground potential. In the case of little space in the housing of the switched-mode power supply and required high ISO distances, the invention offers a significant advantage for protecting against interferences. At the same time, only a small number of additional components are required.

According to a further advantageous embodiment of the switched-mode power supply according to the invention, provision is made for the filter device to comprise capacitors which are connected upstream and/or downstream of the choke coil.

On the one hand, a smoothing of the current can take place as a result. On the other hand, voltage peaks are further absorbed. In addition, not exceeding the dielectric strength of the individual components can be achieved by designing the capacitors in a suitable manner.

Finally, according to a further advantageous embodiment of the switched-mode power supply according to the invention, provision can be made for the filter device to be connected upstream of the rectifier device.

In this way, the rectifier can work directly with an interference-free voltage.

The invention is explained in greater detail hereinafter using an exemplary embodiment. The specific configuration of the exemplary embodiment is in no way intended to be understood as limiting for the general configuration of the switched-mode power supply according to the invention, in fact individual features of the configuration of the exemplary embodiment can be combined freely with one another and with the features described previously in any desired manner.

Other features which are considered as characteristic for the invention are set forth in the appended claims.

Although the invention is illustrated and described herein as embodied in a switched-mode power supply with voltage limitation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
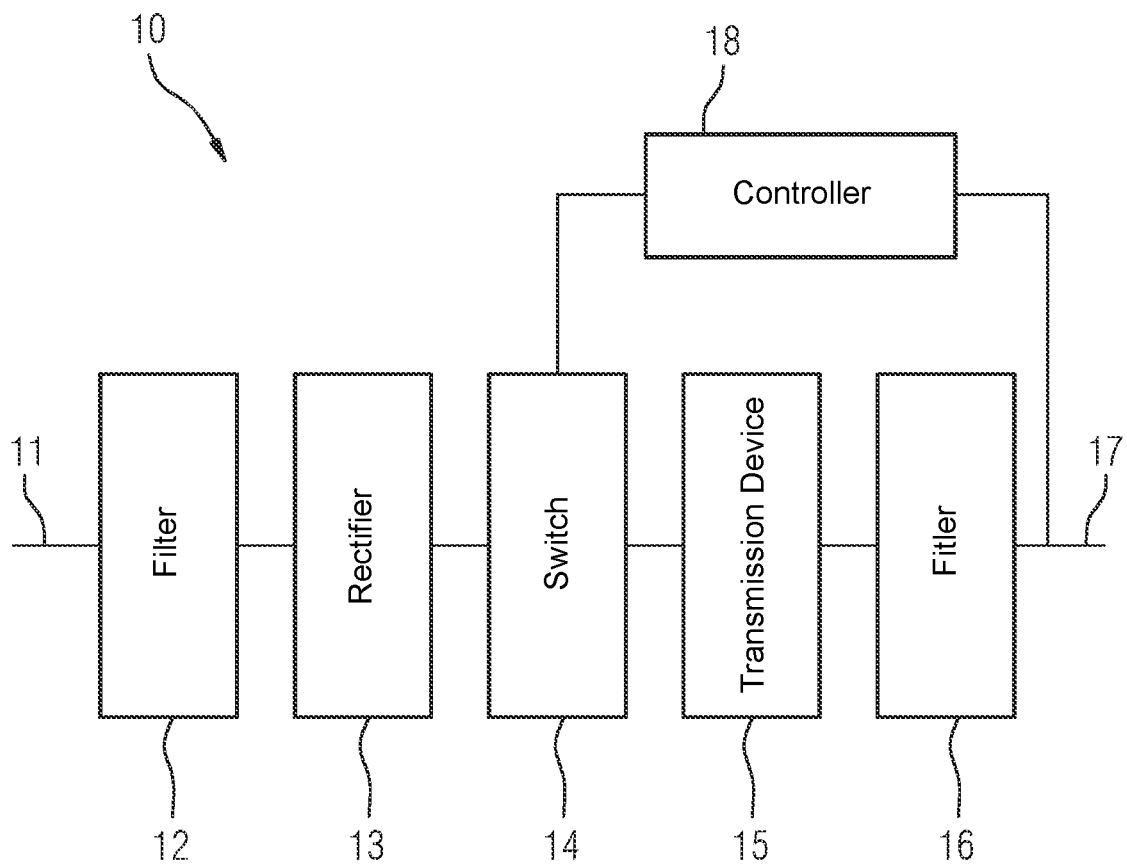
FIG. 1 is an illustration of a basic structure of a switched-mode power supply.

The following is a summary list of reference numerals and the corresponding structure used in the above description of the invention.

Referring now to the figures of the drawings in detail and first, particularly to FIG. 1 thereof, there is shown a schematic representation of a switched-mode power supply 10 with its substantial functional components. A filter device 12, which adjusts the voltage signal and suppresses interference signals, is arranged downstream of an input 11, via which an alternating voltage signal is supplied to the switched-mode power supply. The precise functionality of the filter device 12 is explained in greater detail later in relation to FIG. 2. A rectifier device 13 is arranged downstream of the filter device 12, which rectifier device rectifies the filtered alternating voltage signal which is on the input side. For this purpose, the rectifier device 13 usually contains an interconnection of a plurality of diodes.

A switching unit 14 is arranged downstream of the rectifier device 13, which switching unit switches the rectified voltage signal into pulses with a comparatively high frequency, for example in the kilohertz range, and supplies its output signal to the input of a transmission device 15, for example a transformer, which transforms the signal to a desired voltage level.

After the transformation by means of the transmission device 15, the emitted signal is supplied to an output filter 16 which smooths the signal before it is emitted at an output 17 of the switched-mode power supply 10 at the desired voltage level.

The switching unit 14 is controlled by means of a control device 18 depending on the output signal.

Since high-energy interference signals applied to the switched-mode power supply 10 on the input side, for example so called "surge" and/or "ring wave" signals, can generate effects which can result in dangerous overvoltages at the output of the filter device 12 and can ultimately cause sparkovers with respect to ground potential within the switched-mode power supply 10, a damping of interference signals of this type must be ensured. Moreover, interference signals must be prevented from being coupled into the power grid from the switched-mode power supply 10 on the input side.

For this purpose, the filter device 12 is configured as explained hereinafter by means of FIG. 2.

Figure 2:
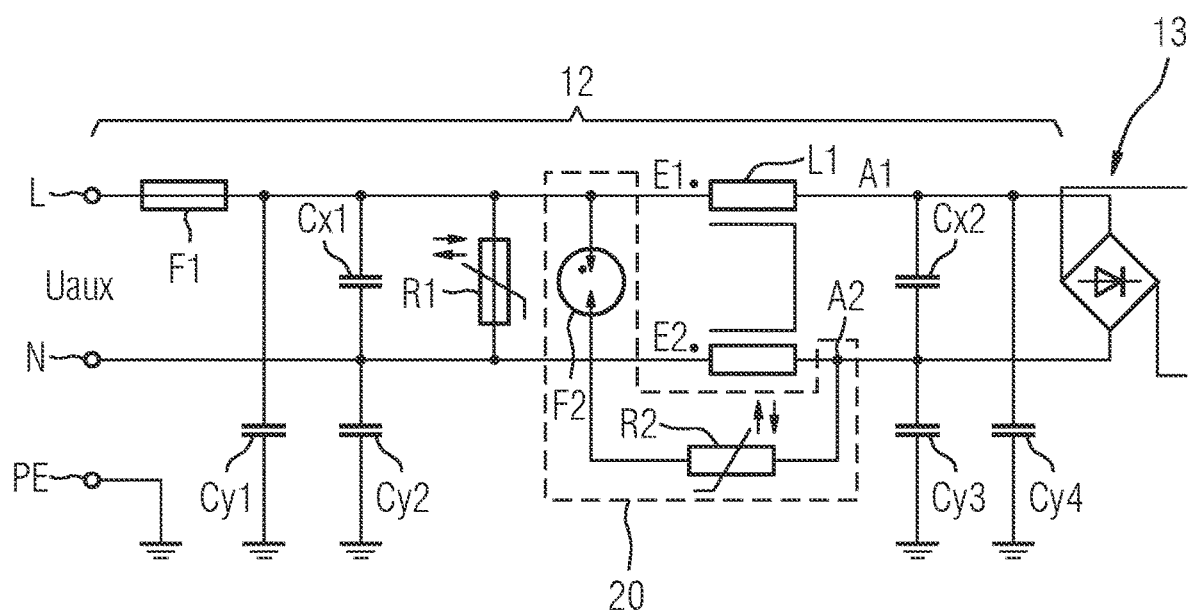
FIG. 2 is an exemplary embodiment of a circuit arrangement for a filter device with an integrated voltage limiter circuit.

FIG. 2 shows an exemplary circuit diagram of the filter device 12 for this purpose.

On the input side, a voltage signal Uaux is supplied to the filter device 12 is via conductors L and N. The housing of the switched-mode power supply is at ground potential PE.

The voltage signal is supplied to a varistor R1 arranged in parallel connection via a fuse F1 and a capacitor circuit (Cx1, Cy1, Cy2), to which varistor inputs E1 and E2 of a current-compensated choke coil L1 are arranged downstream. A capacitor circuit (Cx2, Cy3, Cy4) is again connected to outputs A1, A2 of the current-compensated choke coil L1. The rectifier device 13 is connected to the filter device 12 on the output side.

For suppressing interference signals, the filter device 12 has a voltage limiter circuit 20 which is indicted in FIG. 2 by a dashed frame. The voltage limiter circuit 20 is connected to the current-compensated choke coil L1. In this case, the voltage limiter circuit 20 consists of a series connection of a surge arrester F2 and a varistor R2.

If a potential difference arises via the current-compensated choke coil L1 in the case of a high-energy interference signal to ground potential, the surge arrester F2 ignites and the oscillation of the interference signal is damped with the varistor R2. During normal operation (no exposure to interference signals), the voltage limiter circuit has a very high impedance and does not present a parallel path via which interference signals (radio interference voltages) could leave the switched-mode power supply.

In this case, the voltage limiter circuit 20 is configured and connected to the current-compensated choke coil in such a way that the overvoltage resulting from the interference influence is damped. In contrast, in normal operation (no interferences from outside), the circuit has a high impedance. This prevents any resulting radio interference voltages from reaching the input of the switched-mode power supply on the outside.

For this purpose, the voltage limiter circuit 20 consists of two elements: the surge arrester F2 is used as a switching element. In the non-switched state, it has a very high impedance (in the range of G$\Omega$). If a voltage difference arises via the choke coil L1, it connects through very quickly (switching time in the range of nanoseconds). The second element is the varistor R2 which is connected in series downstream of the surge arrester F2. It damps the oscillation of the interference signal if the surge arrester is connected through. The voltage limiter circuit 20 is virtually connected diagonally via the current-compensated choke coil L1, i.e. from an input E1 in a first conductor L to an output A2 in the second conductor N. Alternatively, a wiring could also take place between input E2 and output A1, since the inputs E1, E2 and the outputs A1, A2 are in each case short circuited with an x capacitor for the interference pulses. Over oscillations behind the current-compensated choke coil L1 which are traced back to high-energy interferences on the conductors L and N are therefore damped.

Despite the fact that the invention has been illustrated and described in greater detail previously by way of preferred exemplary embodiments, the invention is not limited by the disclosed examples and other variations can be derived from this by the person skilled in the art, without departing from the scope of protection of the subsequent claims.

The invention claimed is:

1. A switched-mode power supply, comprising:
   a rectifier;
   a switching unit disposed downstream of said rectifier;
   a transmission device disposed downstream of said switching unit;
   a filter having a voltage limiter circuit and a current-compensated choke coil connected to said voltage limiter circuit in such a way that in a case of interference signals applied to said current-compensated choke coil, a damping of the interference signals takes place by way of said voltage limiter circuit;
   said voltage limiter circuit containing a surge arrester and a varistor, said surge arrester and said varistor being connected in series; and
   said voltage limiter circuit being connected diagonally via said current-compensated choke coil, such that:
      said surge arrester, on an input side, is connected to an input of said current-compensated choke coil which is to be connected to a first conductor; and
      said varistor has an output side connected to an output of said current-compensated choke coil which has an input to be connected to a second conductor.

2. The switched-mode power supply according to claim 1, wherein said filter has capacitors which are connected upstream and/or downstream of said current-compensated choke coil.

3. The switched-mode power supply according to claim 1, wherein said filter is connected upstream of said rectifier.

* * * * *